(12) United States Patent
Holsman

(10) Patent No.: US 11,616,639 B2
(45) Date of Patent: *Mar. 28, 2023

(54) STORING TIME-SENSITIVE SECRETS IN A BLOCKCHAIN NETWORK

(71) Applicant: block.one, Grand Cayman, KY (US)

(72) Inventor: Ian Holsman, Minneapolis, MN (US)

(73) Assignee: BULLISH GLOBAL, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/385,739

(22) Filed: Jul. 26, 2021

(65) Prior Publication Data
US 2022/0263647 A1    Aug. 18, 2022

Related U.S. Application Data

(63) Continuation of application No. 17/177,108, filed on Feb. 16, 2021, now Pat. No. 11,075,747.

(51) Int. Cl.
*H04L 29/06* (2006.01)
*H04L 9/06* (2006.01)
(Continued)

(52) U.S. Cl.
CPC .......... *H04L 9/0643* (2013.01); *H04L 9/3297* (2013.01); *H04L 9/50* (2022.05)

(58) Field of Classification Search
None
See application file for complete search history.

(56) References Cited

U.S. PATENT DOCUMENTS

2018/0006826 A1* 1/2018 Smith ................. H04L 9/006
2018/0039667 A1* 2/2018 Pierce ................. H04L 9/3247
(Continued)

OTHER PUBLICATIONS

Zhou, Ning et al. Volunteer service time record system based on blockchain technology. 2017 IEEE 2nd Advanced Information Technology, Electronic and Automation Control Conference (IAEAC). https://ieeexplore.ieee.org/stamp/stamp.jsp?tp=&arnumber=8054088 (Year: 2017).*

Dai, Chuangchuang et al. Change-Encryption: Encryption Using Spatiotemporal Information as a Function Model. 2020 7th IEEE International Conference on Cyber Security and Cloud Computing (CSCloud). https://ieeexplore.ieee.org/stamp/stamp.jsp?tp=&arnumber=9170985 (Year: 2020).*

(Continued)

*Primary Examiner* — Jeremiah L Avery
(74) *Attorney, Agent, or Firm* — McDermott Will & Emery LLP (57) ABSTRACT

A method for storing time-sensitive secrets in a network is provided. The method includes receiving a first encryption key from multiple encryption keys, the multiple encryption keys associated with a first time window and accessing a data packet encoded according to the encryption keys. The method also includes writing a decrypted data packet to a block in a blockchain when the first encryption key matches a first time-sensitive value, and writing the decrypted data packet to the block in the blockchain when a second encryption key, received from the content provider, matches a second time-sensitive value after the first time-sensitive value has lapsed, wherein the first time-sensitive value and the second time-sensitive value are a non-overlapping time sequence in the first time window. A system and a non-transitory, computer-readable medium storing instructions to perform the above method are also provided.

20 Claims, 6 Drawing Sheets

(51) Int. Cl.
  *H04L 9/32* (2006.01)
  *H04L 9/00* (2022.01)

(56) References Cited

U.S. PATENT DOCUMENTS

| | | | | |
|---|---|---|---|---|
| 2018/0157825 A1* | 6/2018 | Eksten | .................. | H04L 9/3247 |
| 2019/0082007 A1* | 3/2019 | Klarman | ............... | H04L 63/123 |
| 2019/0197532 A1* | 6/2019 | Jayachandran | ....... | H04L 9/0618 |
| 2019/0268140 A1* | 8/2019 | Kandiraju | ............. | H04L 9/3265 |
| 2019/0273610 A1* | 9/2019 | Fan | ....................... | H04L 9/3239 |
| 2019/0356469 A1* | 11/2019 | Deshpande | ........... | H04L 9/0643 |
| 2020/0005296 A1* | 1/2020 | Green | ................... | H04L 9/3297 |
| 2020/0019288 A1* | 1/2020 | D'Amore | .................. | H04L 9/50 |
| 2020/0019923 A1* | 1/2020 | Santhar | ............. | G06Q 10/0832 |
| 2020/0134066 A1* | 4/2020 | Yegorin | ............. | G06F 16/2379 |
| 2021/0119785 A1* | 4/2021 | Ben-Reuven | ......... | H04L 63/126 |

OTHER PUBLICATIONS

Lai, Wei-Jr et al. A Fully Decentralized Time-Lock Encryption System on Blockchain. 2019 IEEE International Conference on Blockchain (Blockchain). https://ieeexplore.ieee.org/stamp/stamp.jsp?tp=&arnumber=8946269 (Year: 2019).

Ma, Zhuo et al. An Efficient Decentralized Key Management Mechanism for VAN ET With Blockchain. IEEE Transactions on Vehicular Technology vol. 69, Issue: 6. https://ieeexplore.ieee.org/stamp/stamp.jsp?tp=&arnumber-8990046 (Year: 2020).

Zhong, Ping et al. Privacy-Protected Blockchain System. 2019 20th IEEE International Conference on Mobile Data Management ( MDM). https://ieeexplore.ieee.org/stamp/stamp.jsp?tp=&arnumber=8788724 (Year: 2019).

* cited by examiner

STORING TIME-SENSITIVE SECRETS IN A BLOCKCHAIN NETWORK

CROSS-REFERENCE TO RELATED APPLICATIONS

This application claims priority under 35 U.S.C. § 120 as a continuation of U.S. patent application Ser. No. 17/177,108, filed Feb. 16, 2021, of which the disclosure of this application is incorporated by reference herein.

BACKGROUND

Field

The present disclosure generally relates to storing time-sensitive information in a blockchain network. More specifically, the present disclosure relates to storing time-sensitive secrets in a blockchain database prior to publishing the information in an irreversible ledger.

Description of the Related Art

Blockchain networks are widely used for ensuring secured and reliable data transactions. The encryption steps involved in writing blocks to a blockchain network hinder the selective dissemination of data retrieved from an information source prior to irreversibly publishing the data in the blockchain database. However, in multiple instances it is desirable to keep the data as a secret, before publication in the database. For example, a data source may desire to monetize the availability of a fresh data update with selected clients, prior to publication in the blockchain. Current technology lacks such capabilities.

SUMMARY

In one embodiment of the present disclosure, a computer-implemented method is described for storing time-sensitive secrets in a blockchain network. The computer-implemented method includes receiving, in a block producer and from a content provider, a first encryption key selected from among multiple encryption keys, the multiple encryption keys associated with a first time window, and accessing, from a blockchain application in a server, a data packet encoded according to the encryption keys, the data packet provided to the server by the content provider. The computer-implemented method also includes writing a decrypted data packet to a block in a blockchain when the first encryption key matches a first time-sensitive value, and writing the decrypted data packet to the block in the blockchain when a second encryption key, received from the content provider, matches a second time-sensitive value after the first time-sensitive value has lapsed, wherein the first time-sensitive value and the second time-sensitive value are a non-overlapping time sequence in the first time window.

According to one embodiment, a system is described that includes one or more processors and a memory coupled with the one or more processors. The memory includes instructions that, when executed by the one or more processors, cause the one or more processors to receive, in a block producer and from a content provider, a first encryption key selected from among multiple encryption keys, the multiple encryption keys associated with a first time window. The one or more processors also execute instructions to access, from a blockchain application in a server, a data packet encoded according to the encryption keys, the data packet provided to the server by the content provider, to write a decrypted data packet to a block in a blockchain when the first encryption key matches a first time-sensitive value, and to write the decrypted data packet to the block in the blockchain when a second encryption key, received from the content provider, matches a second time-sensitive value after the first time-sensitive value has lapsed. The first time-sensitive value and the second time-sensitive value are a non-overlapping time sequence in the first time window. The one or more processors also execute instructions to form the first encryption key with a first component from the block producer and a second component from the blockchain application.

According to one embodiment, a non-transitory, machine-readable medium is described that includes instructions, which when executed by one or more processors, cause a computer to perform a method that includes receiving, in a block producer and from a content provider, a first encryption key selected from among multiple encryption keys, the multiple encryption keys associated with a first time window. The method also includes accessing, from a blockchain application in a server, a data packet encoded according to the encryption keys, the data packet provided to the server by the content provider, writing a decrypted data packet to a block in a blockchain when the first encryption key matches a first time-sensitive value, and writing the decrypted data packet to the block in the blockchain when a second encryption key, received from the content provider, matches a second time-sensitive value after the first time-sensitive value has lapsed. The first time-sensitive value and the second time-sensitive value are a non-overlapping time sequence in the first time window. The method also includes forming the first encryption key with a first component from the block producer and a second component from the blockchain application and invalidating one of the first encryption key and the second encryption key, when it has been used.

In yet another embodiment, a system is provided. The system includes a first means for storing instructions, and a second means for executing the instructions to cause the system to perform a method. The method includes receiving, in a block producer and from a content provider, a first encryption key selected from among multiple encryption keys, the multiple encryption keys associated with a first time window. The method also includes accessing, from a blockchain application in a server, a data packet encoded according to the encryption keys, the data packet provided to the server by the content provider, writing a decrypted data packet to a block in a blockchain when the first encryption key matches a first time-sensitive value, and writing the decrypted data packet to the block in the blockchain when a second encryption key, received from the content provider, matches a second time-sensitive value after the first time-sensitive value has lapsed. The first time-sensitive value and the second time-sensitive value are a non-overlapping time sequence in the first time window. The method also includes forming the first encryption key with a first component from the block producer and a second component from the blockchain application and invalidating one of the first encryption key and the second encryption key, when it has been used.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

In the following detailed description, numerous specific details are set forth to provide a full understanding of the present disclosure. It will be apparent, however, to one ordinarily skilled in the art, that embodiments of the present disclosure may be practiced without some of these specific details. In other instances, well-known structures and techniques have not been shown in detail so as not to obscure the disclosure.

General Overview

In blockchain networks, to access information on a blockchain, a blockchain producer or client executes a 'write' action (e.g., from a blockchain application) that is subject to latency and resource consumption charges. However, for some blockchain applications (e.g., weather and stock market price feeds) whose values may be updated frequently, and read less often, a faster data storing scheme may be desirable to have an accurate account of the state of a rapidly changing variable, and yet reap the benefits of a secure and immutable ledger in the blockchain.

The disclosed system addresses this problem specifically arising in the realm of computer technology by providing a solution also rooted in computer technology, namely, opening a secondary mechanism for information providers (e.g., reliable data sources) to store information in a random access memory (RAM), or any other low-latency access storage in the block producer. This storage can be accessed via a blockchain application, on demand, with low latency. In some embodiments, the information provider's data and lineage (e.g., metadata and history) would be validated when it is encrypted and stored in a block in the blockchain. For example, in some embodiments, the stock price, timestamp, and the information provider's internal reference would be stored in the blockchain. In some embodiments, a similar system may be implemented on a block producer that uses other low-latency techniques available today. Additionally, some embodiments include a smart contract accessing the value of the data at a later time (including metadata showing lineage). Accordingly, at this point, the data may be written in the blockchain record through the normal mechanisms of irreversibility (e.g., encryption) by a 'write' action from the blockchain application.

The subject system provides several advantages, including accessibility to rapidly updated data by a selected blockchain application, before this data is irreversibly placed in a ledger of the blockchain with access from any block producer having the required public key.

Example System Architecture

Figure 1:
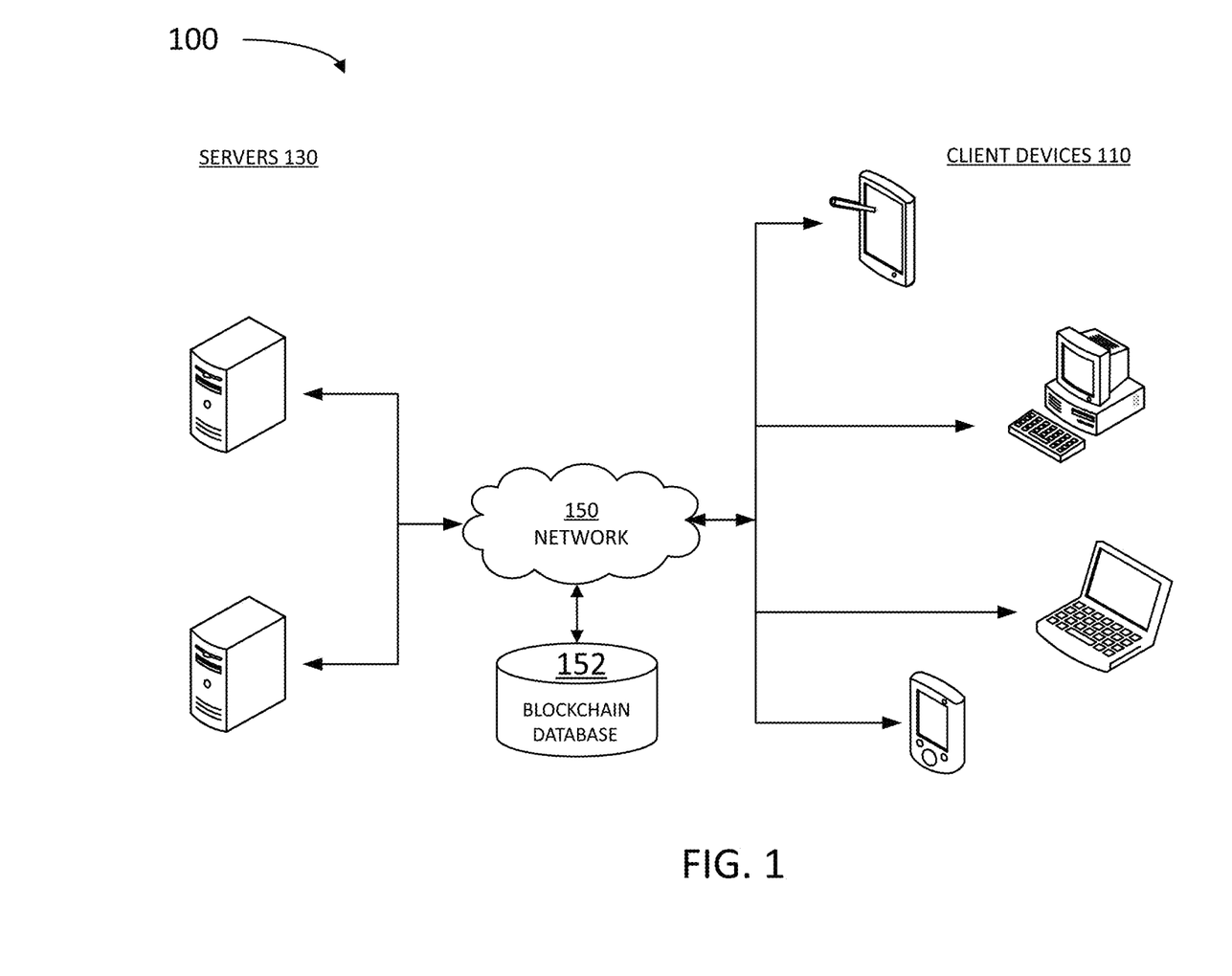
FIG. 1 illustrates an example architecture suitable for fast access to a data resource update in a blockchain network, according to some embodiments.

FIG. 1 illustrates an example architecture 100 for a blockchain network suitable for practicing some implementations of the disclosure. Architecture 100 includes servers 130 and client devices 110 coupled over a network 150. One of the many servers 130 is configured to host a memory, including instructions which, when executed by a processor, cause the server 130 to perform at least some of the steps in methods as disclosed herein. In some embodiments, architecture 100 is configured to store data in a blockchain database 152. Blockchain database 152 may be accessed by block producers in servers 130, and other authorized clients of the blockchain network, who may be users of client devices 110. Servers 130 may also include service providers that collect data from multiple sources to create an immutable register (e.g., a smart contract) in blockchain database 152. Accordingly, service providers may host blockchain applications running in virtual machine containers within a block producer. In addition, servers 130 may include information providers that collect time-sensitive information for the blockchain applications. In some embodiments, the information provider may be a reliable data source that uses a verifiable signature across the blockchain network. The verifiable signature guarantees the identity of the data source and the trustworthiness of the data provided.

Servers 130 may include any device having an appropriate processor, memory, and communications capability for hosting and accessing blockchain database 152, and a virtual machine container to run a blockchain application. The blockchain application may be accessible by various clients 110 over network 150. In some embodiments, servers 130 may include a signature verification tool configured to handle public and private keys to access blockchain database 152. Client devices 110 may include, for example, desktop computers, mobile computers, tablet computers (e.g., including e-book readers), mobile devices (e.g., a smartphone or PDA), or any other devices having appropriate processor, memory, and communications capabilities for accessing the blockchain tool in one or more of servers 130, and blockchain database 152. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
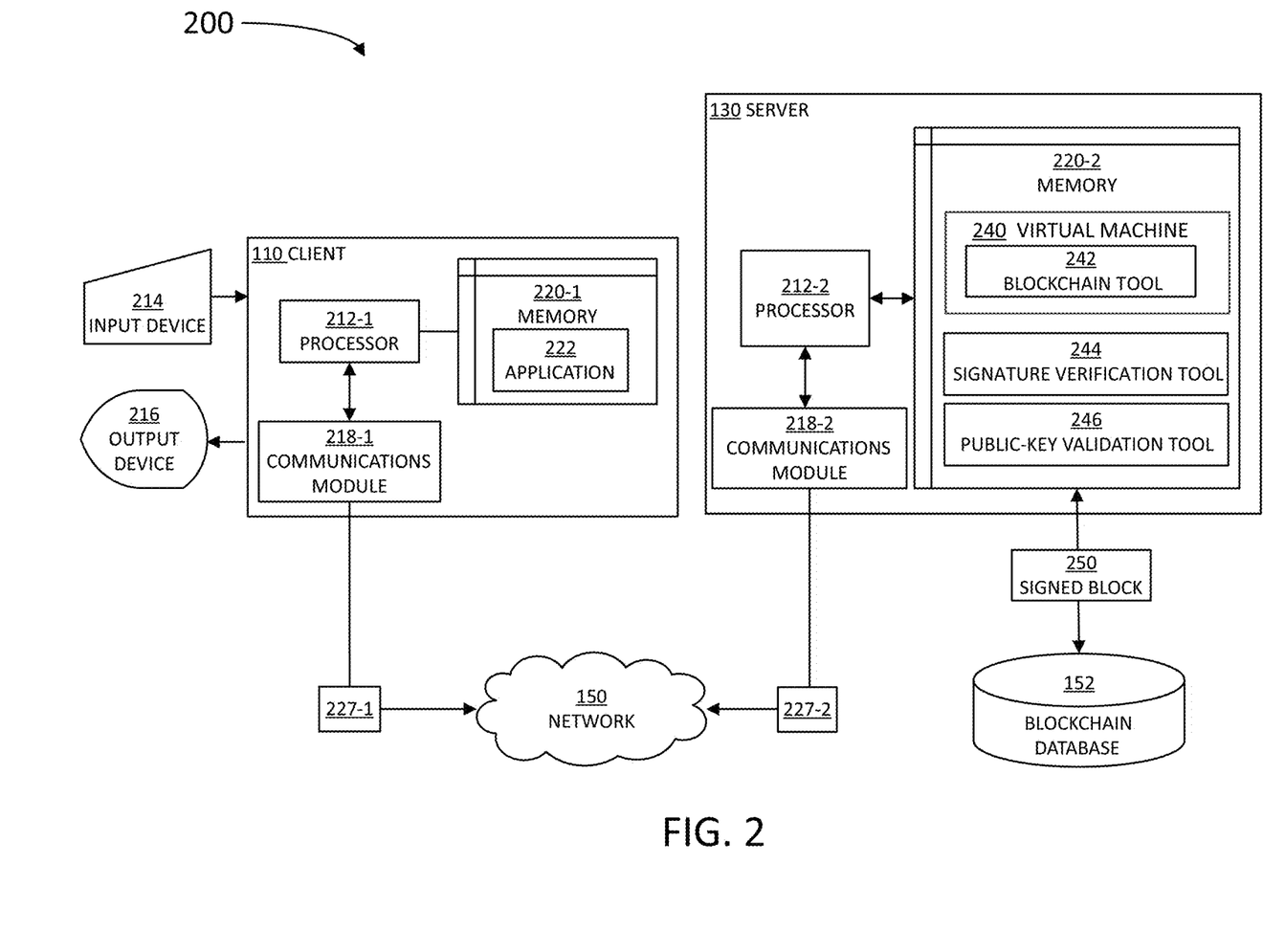
FIG. 2 is a block diagram illustrating an example server and client from the architecture of FIG. 1, according to certain aspects of the disclosure.

FIG. 2 is a block diagram 200 illustrating an example server 130, client device 110, and blockchain database 152 in the architecture 100 of FIG. 1, according to certain aspects of the disclosure. Client device 110 and server 130 are communicatively coupled over network 150 via respective communications modules 218-1 and 218-2 (hereinafter, collectively referred to as "communications modules 218"). Communications modules 218 are configured to interface with network 150 to send and receive information, such as data, requests, responses, and commands to other devices on the network. Communications modules 218 can be, for example, modems, Ethernet cards, or any port that receives information from an external device. Communications modules 218 may include hardware and software to handle data encryption, and direct access to a virtual machine container (e.g., an 'action' port for a blockchain application), or direct access to a low latency memory circuit, such as a RAM circuit.

Client device 110 may be coupled with an input device 214 and with an output device 216. Input device 214 may include a keyboard, a mouse, a pointer, or even a touch-screen display that a consumer may use to interact with client device 110. Likewise, output device 216 may include a display and a speaker with which the consumer may retrieve results from client device 110. Client device 110 may also include a processor 212-1, configured to execute instructions stored in a memory 220-1, and to cause client device 110 to perform at least some of the steps in methods consistent with the present disclosure. Memory 220-1 may further include an application 222, including specific instructions which, when executed by processor 212-1, cause a blockchain tool 242 from server 130 to display information in output device 216. In that regard, application 222 may include a smart contract application, or any other blockchain application as disclosed herein. Client device 110 may provide a data packet 227-1 to server 130, via network 150. Likewise, server 130 may provide a data packet 227-2 to client device 110. Hereinafter, data packets 227-1 and 227-2 will be referred to, collectively, as "data packets 227."

Server 130 includes a memory 220-2, a processor 212-2, and communications module 218-2. Processor 212-2 is configured to execute instructions, such as instructions physically coded into processor 212-2, instructions received from software in memory 220-2, or a combination of both. Memory 220-2 includes a virtual machine 240 wherein a blockchain tool 242 is installed. Memory 220-2 may also include a signature verification tool 244 and a public-key validation tool 246, configured to validate, authenticate, and verify access from different client devices 110 and servers 130 to blockchain database 152. Accordingly, server 130 may verify and apply a signature to a data block before storing in blockchain database 152. Hereinafter, processors 212-1 and 212-2 will be collectively referred to as "processors 212," and memories 220-1 and 220-2 will be collectively referred to as "memories 220." In some embodiments, memories 220 may include low latency memories, such as RAM (dynamic-RAM-DRAM-, or static RAM-SRAM-) that can be accessed quickly from an external device via a plugin socket in communications modules 218.

Data packets 227 may include time-sensitive information (e.g., time stamps and other metadata) and data value updates (e.g., stock market prices, weather conditions, sensor measurements, and the like). In some embodiments, data packets 227 may include encryption data and passwords, such as public keys and private keys. Moreover, in some embodiments, data packets 227 may include data signed by an authorized client or server in the blockchain network and already stored in memories 220. In some embodiments, data packets 227 may include a "blob" with multiple passwords, each password associated with a time-sensitive value. When a data packet or data update is accessed by a block producer in the blockchain network, it is saved as a signed/verified block 250 in blockchain database 152. In some embodiments, signed block 250 may include other action results from other external client devices 110, including various signatures and mechanisms to make it cryptographically secure. Signed block 250 may then be sent from server 130 to other block producers or client devices where it could be re-run (using the decrypted data) by a blockchain application.

Figure 3A:
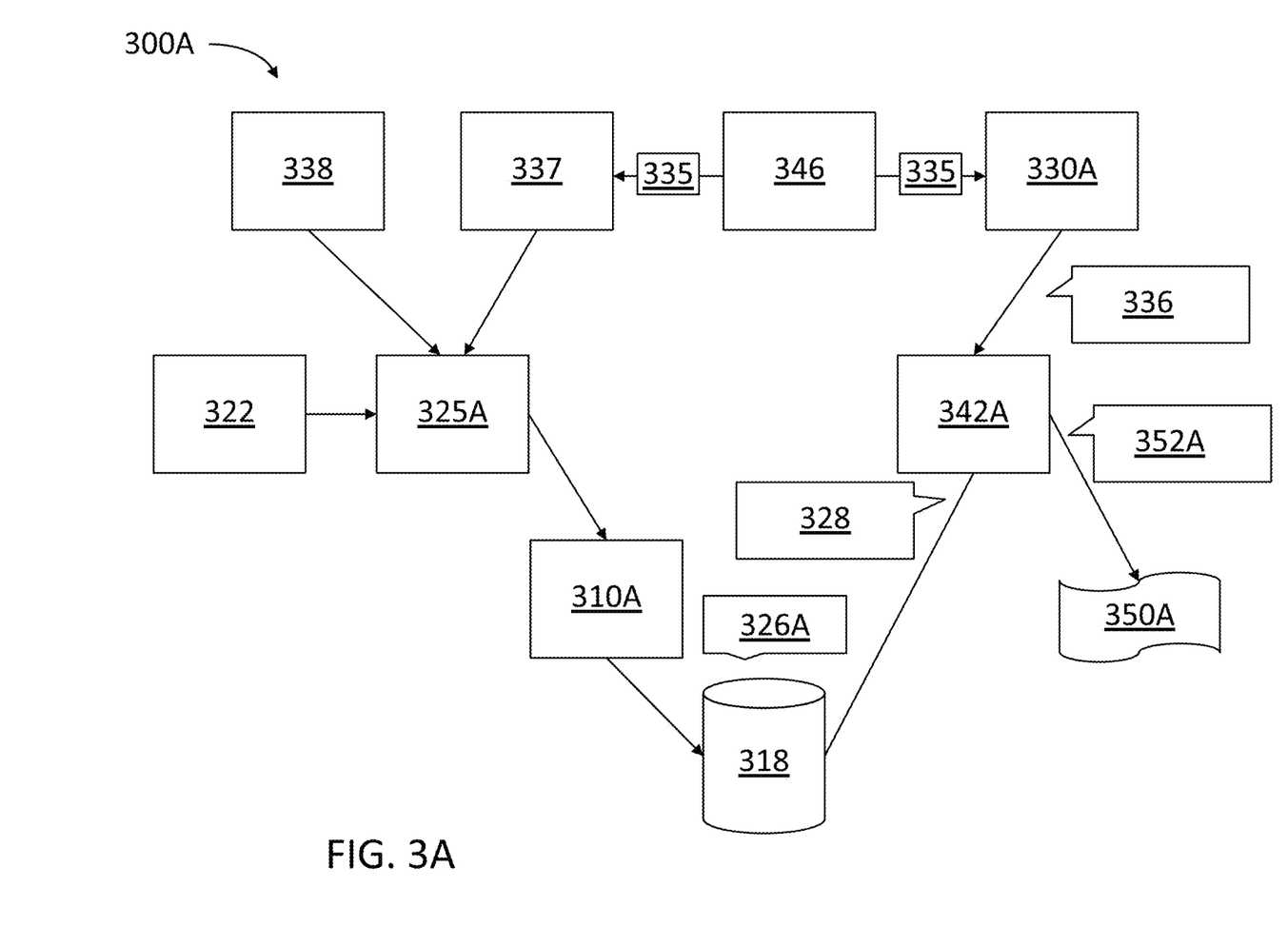
FIGS. 3A-3B illustrate a blockchain network with one or more block producers communicatively coupled to an information provider, and to a server hosting a blockchain application, according to some embodiments.
Figure 3B:
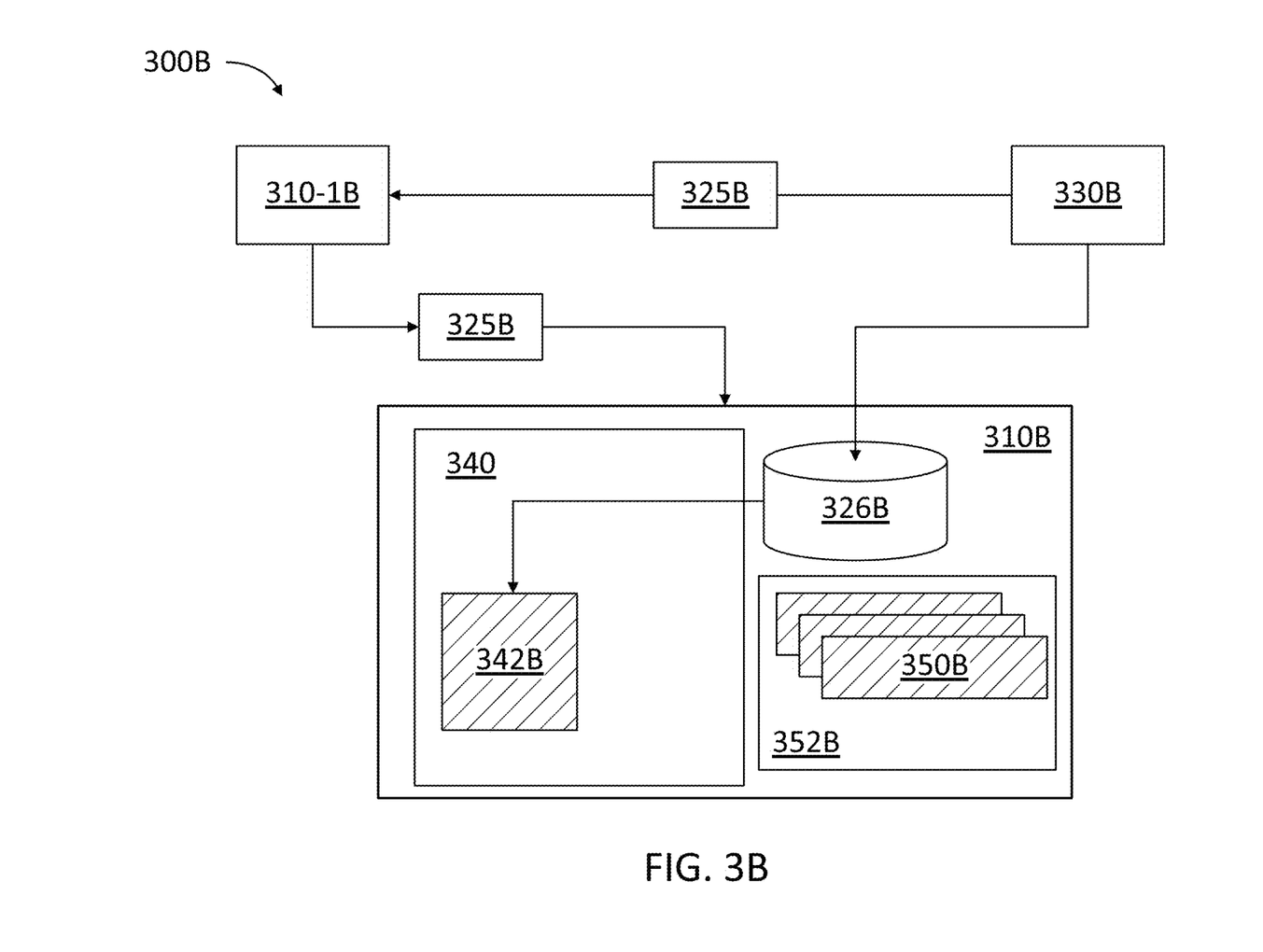

FIGS. 3A-3B illustrate blockchain networks 300A and 300B (hereinafter, collectively referred to as "blockchain networks 300") with one or more block producers 310A and 310B (hereinafter, collectively referred to as "block producers 310") communicatively coupled to a server 330A or 330B (hereinafter, collectively referred to as "servers 330"). In some embodiments, server 330A may host a blockchain application 342A (e.g., a smart contract application). In some embodiments, server 330B may host an information provider service, such as a stock market value appraiser, or a weather service, or any other type of network provider of time-sensitive information.

FIG. 3A illustrates blockchain network 300A. In some embodiments, server 330A receives one or more passwords 335 from a password generator 346 (which may be part of server 330 or of a different server communicatively coupled with server 330). Password generator 346 also provides password 335 to a set 337 of multiple passwords associated with a time-sensitive value 338. In some embodiments, there may be 'N' passwords in set 337, each associated with a distinct time-sensitive value 338, wherein time-sensitive values are encompassed within a selected time window. For example, in some embodiments, a time window may include a specific time of a 30 minute duration, and time-sensitive values 338 may include thirty (30) or less, one minute intervals inscribed within the 30 minute time window.

Block producer 310 provides an access block 325A to a state variable 318 that will be used by blockchain application 342A. Block 325A includes the N passwords 337, including time-sensitive values 338 encrypted according to a public key 322 to access blockchain network 300. The state variable 318 includes a block 326A that includes the updated value for the state variable combined with the access block 325A. A decrypted block 328 may be accessed by blockchain application 342A using a private key, which may then store the updated value for state variable 318 in a decrypted value 352A prior to storing it as a signed/verified block 350A in a blockchain database.

In some embodiments, server 330A may access updated state variable value in block 326A using a combination 336 of password 335 encrypted by a public key to blockchain network 300.

FIG. 3B illustrates blockchain network 300B including a server 330B (time-sensitive information provider), block producer 310B, and an external client 310-1B. In some embodiments, server 330B encrypts the time-sensitive information and sends an action to block producer 310B to store a payload 326B in blockchain database 352B as a signed/verified block 350B. In some embodiments, payload 326B includes the time-sensitive information optionally encrypted with a secret key 325B and a set of keys from block producer 310B. Accordingly, to access the time-sensitive information in payload 326B, external client 310-1B may use secret key 325B and, optionally one of the secret keys from block producer 310B. This encrypted payload would be stored in the blockchain database 352B.

In some embodiments, server 330B provides secret key 325B to external client 310-1B. External client 310-1B may then execute their own action on blockchain contract 342B, running on VM 340 in block producer 310B accessing the data in payload 326B (before it even is stored in blockchain database 352B). In some embodiments, VM 340 provides a function that would decrypt payload 326B (e.g., using a combination of the private key for block producer 310B and secret key 325B. In some embodiments, signed block 350B may include other action results from other external clients, including various signatures and mechanisms to make it cryptographically secure. Signed block 350B may then be sent from block producer 310B to other block producers where it could be re-run (using the decrypted data).

Figure 4:
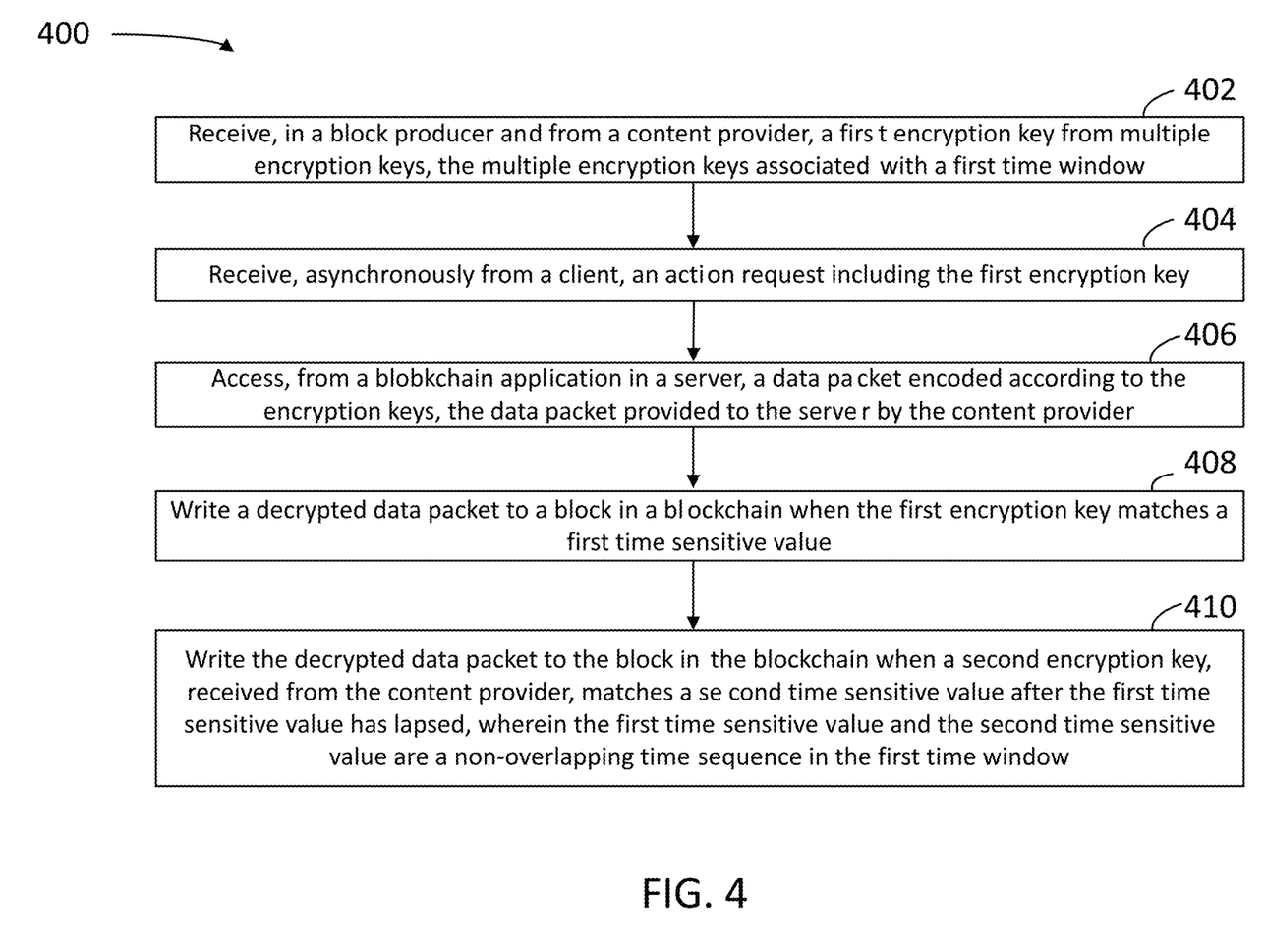
FIG. 4 is a flow chart illustrating steps in a method for storing time-sensitive secrets in a blockchain network, according to some embodiments.

FIG. 4 is a flow chart illustrating steps in a method 400 for storing time-sensitive secrets in a blockchain network, according to some embodiments. One or more of the steps in method 400 may be at least partially performed by a processor executing commands stored in a memory, the processor and memory being part of a client device, a server, or a blockchain database communicatively coupled with each other via a network (e.g., processors 212, memories 220, client devices 110, servers 130, network 150, and blockchain database 152). In some embodiments, the memory may include a virtual machine having a blockchain tool hosting a blockchain application in the client device, and the server may be a block producer coupled to a blockchain database, as disclosed herein (e.g., virtual machine 240, blockchain tool 242, and blockchain database 152). The memory may also include an encryption tool having a signature verification tool and a public-key validation tool to verify access to the blockchain tool and the blockchain database to other servers and clients (e.g., signature verification tool 244 and public-key validation tool 246). In some embodiments, methods consistent with the present disclosure may include one or more steps from method 400 performed in a different order, at the same time, simultaneously, quasi-simultaneously, or overlapping in time.

Step 402 includes receiving, in a block producer and from a content provider, a first encryption key from multiple encryption keys, the multiple encryption keys associated with a first time window. In some embodiments, step 402 includes forming the first encryption key with a first component from the block producer and a second component from the blockchain application. In some embodiments, step 402 includes providing a second group of multiple keys that apply for a second time window. In some embodiments, step 402 includes requesting, to the content provider, a second group of multiple keys that apply for a second time window when the first time window has elapsed. In some embodiments, step 402 includes providing an authentication credential to the content provider. In some embodiments, step 402 includes verifying that the content provider is a reliable data source. In some embodiments, step 402 includes receiving, from a password generator, multiple passwords and multiple time-sensitive values within the first time window, forming an encrypted block including each of the multiple passwords associated with each of the time-sensitive values encrypted with a public key of the block producer, and providing the encrypted block to the blockchain application.

Step 404 includes receiving, asynchronously from a client, an action request including the first encryption key. In some embodiments, the action request may include accessing, storing, or updating a state variable value in a blockchain application (e.g., a smart contract application), as disclosed herein.

Step 406 includes accessing, from a blockchain application in a server, a data packet encoded according to the encryption keys, the data packet provided to the server by the content provider. In some embodiments, step 406 includes decrypting the data with a second key from the blockchain application. In some embodiments, step 406 includes providing the time-sensitive key to a selected second blockchain producer.

Step 408 includes writing a decrypted data packet to a block in a blockchain when the first encryption key matches a first time-sensitive value. In some embodiments, step 408 includes invalidating one of the first encryption key and the second encryption key, when it has been used.

Step 410 includes writing the decrypted data packet to the block in the blockchain when a second encryption key, received from the content provider, matches a second time-sensitive value after the first time-sensitive value has lapsed, wherein the first time-sensitive value and the second time-sensitive value are a non-overlapping time sequence in the first time window.

Hardware Overview

Figure 5:
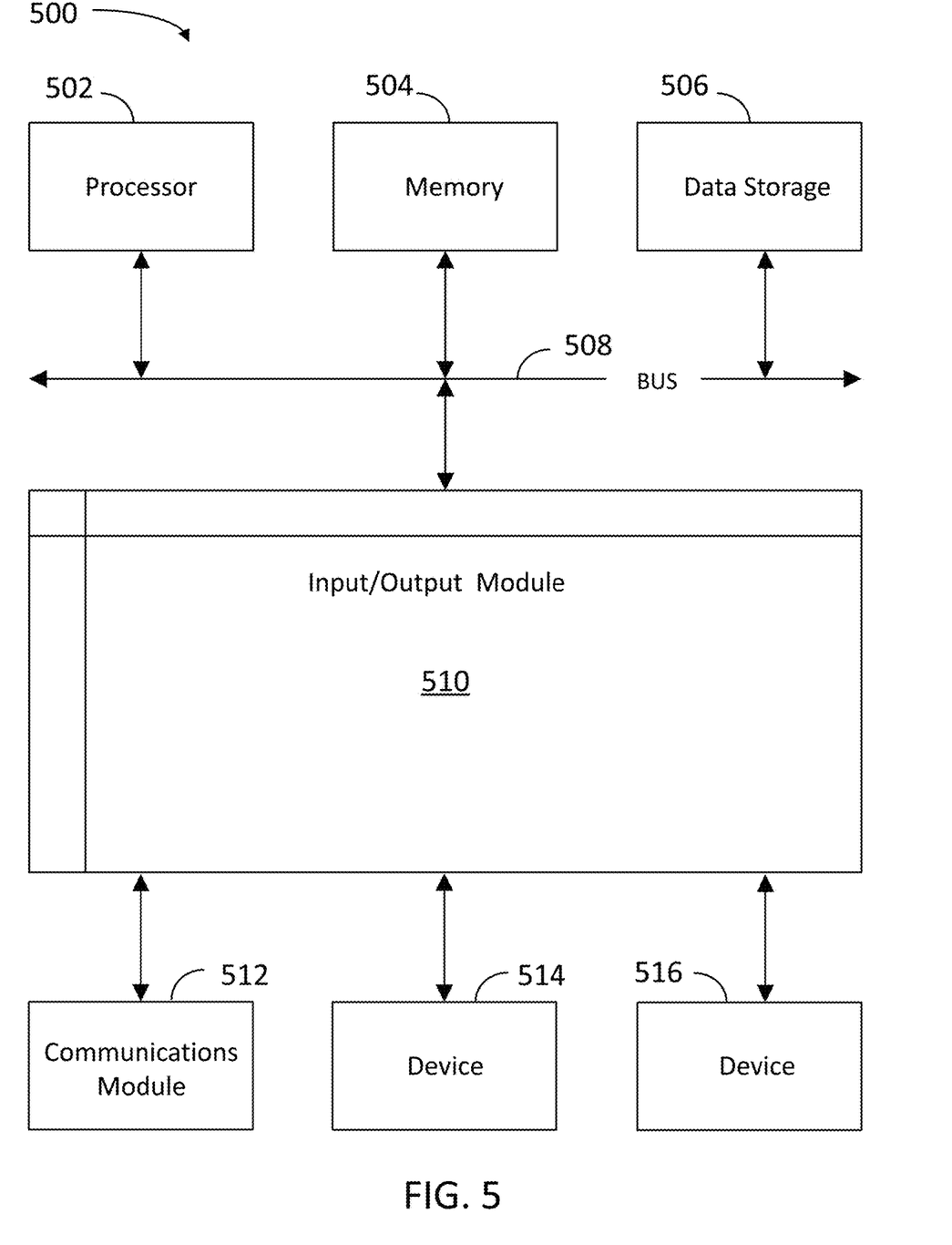
FIG. 5 is a block diagram illustrating an example computer system with which the client and server of FIGS. 1 and 2 and the method of FIG. 4 can be implemented.

FIG. 5 is a block diagram illustrating an example computer system 500 with which the client and server of FIGS. 1 and 2 and the methods of FIG. 4 can be implemented. In certain aspects, the computer system 500 may be implemented using hardware or a combination of software and hardware, either in a dedicated server, or integrated into another entity, or distributed across multiple entities.

Computer system 500 (e.g., client device 110 and server 130) includes a bus 508 or other communication mechanism for communicating information, and a processor 502 (e.g., processors 212) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled with bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, e.g., one or more modules of computer program instructions encoded on a computer-readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and intercoupled by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled with bus 508 for storing information and instructions. Computer system 500 may be coupled via input/output module 510 to various devices. Input/output module 510 can be any input/output module. Exemplary input/output modules 510 include data ports such as USB ports. The input/output module 510 is configured to connect to a communications module 512. Exemplary communications modules 512 (e.g., communications modules 218) include networking interface cards, such as Ethernet cards and modems. In certain aspects, input/output module 510 is configured to connect to a plurality of devices, such as an input device 514 (e.g., input device 214) and/or an output device 516 (e.g., output device 216). Exemplary input devices 514 include a keyboard and a pointing device, e.g., a mouse or a trackball, by which a consumer can provide input to the computer system 500. Other kinds of input devices 514 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 516 include display devices, such as an LCD (liquid crystal display) monitor, for displaying information to the consumer.

According to one aspect of the present disclosure, the client device 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical consumer interface or a Web browser through which a consumer can interact with an implementation of the subject matter described in this specification, or any combination of one or more such back end, middleware, or front end components. The components of the system can be intercoupled by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires forming bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, and other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following clauses. For example, while operations are depicted in the drawings in a particular order, this should not be understood as requiring that such operations be performed in the particular order shown or in sequential order, or that all illustrated operations be performed, to achieve desirable results. The actions recited in the clauses can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the clauses. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each clause. Rather, as the clauses reflect, inventive subject matter lies in less than all features of a single disclosed configuration or operation. The clauses are hereby incorporated into the detailed description, with each clause standing on its own as a separately described subject matter.

The clauses are not intended to be limited to the aspects described herein, but are to be accorded the full scope consistent with the language clauses and to encompass all legal equivalents. Notwithstanding, none of the clauses are intended to embrace subject matter that fails to satisfy the requirements of the applicable patent law, nor should they be interpreted in such a way.

What is claimed is:

1. A computer-implemented method, comprising:
    receiving, in a block producer and from a content provider, a first encryption key selected from among multiple encryption keys, the multiple encryption keys associated with a first time window;

accessing, from a blockchain application in a server, a data packet encoded according to the encryption keys, the data packet provided to the server by the content provider;

writing a decrypted data packet to a block in a blockchain when the first encryption key matches a first time-sensitive value;

forming the first encryption key with a first component from the block producer and a second component from the blockchain application; and invalidating the first encryption key when it has been used.

2. The computer-implemented method of claim 1, further comprising writing the decrypted data packet to the block in the blockchain when a second encryption key, received from the content provider, matches a second time-sensitive value after the first time-sensitive value has lapsed, wherein the first time-sensitive value and the second time-sensitive value are a non-overlapping time sequence in the first time window.

3. The computer-implemented method of claim 1, wherein accessing a data packet comprises accessing data value updates for one of a stock market price, a weather condition, or a remote sensor measurement.

4. The computer-implemented method of claim 1, further comprising receiving a second group of multiple encryption keys that apply for a second time window.

5. The computer-implemented method of claim 1, further comprising requesting, to the content provider, a second group of multiple encryption keys that apply for a second time window when the first time window has elapsed.

6. The computer-implemented method of claim 1, wherein receiving a first encryption key from the content provider comprises providing an authentication credential to the content provider.

7. The computer-implemented method of claim 1, wherein receiving a first encryption key from the content provider comprises verifying that the content provider is a reliable data source.

8. The computer-implemented method of claim 1, further comprising:

receiving, from a password generator, multiple passwords and multiple time-sensitive values within the first time window;

forming an encrypted block including each of the multiple passwords associated with each of the time-sensitive values encrypted with a public key of the block producer; and providing the encrypted block to the blockchain application.

9. The computer-implemented method of claim 1, further comprising decrypting the data packet with a second key from the blockchain application.

10. The computer-implemented method of claim 1, further comprising providing a second encryption key to a selected, second blockchain producer.

11. A system, comprising:

a memory storing multiple instructions; and one or more processors configured to execute the instructions to:

receive, in a block producer and from a content provider, a first encryption key selected from among multiple encryption keys, the multiple encryption keys being associated with a first time window;

access, from a blockchain application in a server, a data packet encoded according to the encryption keys, the data packet provided to the server by the content provider;

write a decrypted data packet to a block in a blockchain when the first encryption key matches a first time-sensitive value;

form the first encryption key with a first component from the block producer and a second component from the blockchain application; and invalidate the first encryption key when it has been used.

12. The system of claim 11, wherein the one or more processors further execute instructions to write the decrypted data packet to the block in the blockchain when a second encryption key, received from the content provider, matches a second time-sensitive value after the first time-sensitive value has lapsed, wherein the first time-sensitive value and the second time-sensitive value are a non-overlapping time sequence in the first time window.

13. The system of claim 11, wherein the one or more processors further execute instructions to receive a second group of multiple encryption keys that apply for a second time window.

14. The system of claim 11, wherein the one or more processors further execute instructions to request, to the content provider, a second group of multiple encryption keys that apply for a second time window when the first time window has elapsed.

15. The system of claim 11, wherein to receive a first encryption key from the content provider the one or more processors execute instructions to provide an authentication credential to the content provider.

16. The system of claim 11, wherein to receive a first encryption key from the content provider the one or more processors execute instructions to verify that the content provider is a reliable data source.

17. The system of claim 11, wherein the one or more processors further execute instructions to encrypt the data packet with a second key from the blockchain application.

18. A non-transitory, computer-readable medium storing instructions which, when executed by a processor, cause a computer to perform a method, the method comprising:

receiving, in a block producer and from a content provider, a first encryption key selected from among multiple encryption keys, the multiple encryption keys associated with a first time window;

accessing, from a blockchain application in a server, a data packet encoded according to the encryption keys, the data packet provided to the server by the content provider;

writing a decrypted data packet to a block in a blockchain when the first encryption key matches a first time-sensitive value;

forming the first encryption key with a first component from the block producer and a second component from the blockchain application;

invalidating the first encryption key when it has been used; and receiving a second group of multiple encryption keys that apply for a second time window.

19. The non-transitory, computer-readable medium of claim 18, further storing instructions for accessing a data packet comprises accessing data value updates for one of a stock market price, a weather condition, or a remote sensor measurement.

20. The non-transitory, computer-readable medium of claim 18, further comprising instructions for requesting, to the content provider, a second group of multiple encryption keys that apply for a second time window when the first time window has elapsed.

\* \* \* \* \*